United States Patent
Benton et al.

(10) Patent No.: US 6,632,507 B2
(45) Date of Patent: Oct. 14, 2003

(54) HOLOGRAPHICALLY ENHANCED DECORATIVE LAMINATE

(75) Inventors: Larry D. Benton, Waco, TX (US); Dorothy Tepera Palmer, Temple, TX (US)

(73) Assignee: Premark RWP Holdings, Inc., Wilmington, DE (US)

( * ) Notice: Subject to any disclaimer, the term of this patent is extended or adjusted under 35 U.S.C. 154(b) by 69 days.

(21) Appl. No.: 09/813,825

(22) Filed: Mar. 22, 2001

(65) Prior Publication Data

US 2001/0046590 A1 Nov. 29, 2001

Related U.S. Application Data

(63) Continuation-in-part of application No. 09/092,480, filed on Jun. 5, 1998.

(51) Int. Cl.⁷ .................. B29C 43/20; B32B 31/20
(52) U.S. Cl. .................. 428/141; 428/156; 428/914; 156/240; 156/247; 156/277; 156/289; 427/147
(58) Field of Search .................. 156/230, 233, 156/240, 247, 277, 289; 428/141, 156, 41.8, 42.1, 411.1, 457, 914

(56) References Cited

U.S. PATENT DOCUMENTS

| | | | |
|---|---|---|---|
| 3,733,381 A | 5/1973 | Willette et al. | 264/47 |
| 3,761,338 A | 9/1973 | Ungar et al. | |
| 3,869,535 A | 3/1975 | Coll-Palagos | 264/219 |
| 3,997,696 A | 12/1976 | Jaisle et al. | 428/164 |
| 4,035,549 A | 7/1977 | Kennar | 428/409 |
| 4,124,421 A | 11/1978 | Fujii | 156/87 |
| 4,284,453 A | 8/1981 | Endrizzi | 156/154 |
| 4,297,945 A | 11/1981 | Sano et al. | 101/395 |
| 4,327,121 A | 4/1982 | Gray, III | 427/44 |
| 4,657,006 A | 4/1987 | Rawlings et al. | 128/156 |
| 4,675,232 A | 6/1987 | Edenbaum et al. | 428/317.3 |
| 4,798,604 A | 1/1989 | Carter | 604/383 |
| 4,816,314 A | 3/1989 | Prawdzik et al. | 156/235 |
| 4,874,129 A | 10/1989 | DiSapio et al. | 239/36 |

(List continued on next page.)

FOREIGN PATENT DOCUMENTS

| | | |
|---|---|---|
| EP | 327095 | 8/1989 |
| EP | 0-327-095 A1 | 8/1989 |
| EP | 370 331 | 10/1989 |

(List continued on next page.)

OTHER PUBLICATIONS

European Search Report (EP 99–10–6627) Dated Dec. 6, 2000, ",".
European Search Report (EP–00–12–4770) Dated Feb. 28, 2001, ",".
Taiwanese Search Report Dated Aug. 28, 2000, ",".

*Primary Examiner*—Sam Chuan Yao
(74) *Attorney, Agent, or Firm*—Welsh & Flaxman LLC

(57) ABSTRACT

The invention relates to a decorative laminate lay-up including a decorative laminate sheet assembly having a top layer and a polypropylene release sheet applied to the top layer of the decorative laminate sheet assembly. The polypropylene release sheet is a cast polypropylene release sheet formed with a holographic transfer image. The decorative laminate is manufactured by the process comprising the steps of stacking a decorative laminate sheet assembly having a top layer, casting a polypropylene release sheet wherein the polypropylene release sheet is formed with a holographic transfer image, positioning the polypropylene release sheet on the top layer of the decorative laminate sheet assembly, applying heat and pressure to the decorative laminate sheet assembly and the polypropylene release sheet sufficient to bond the decorative laminate and releasably bond the polypropylene release sheet to the top layer of the decorative laminate sheet assembly and removing the polypropylene release sheet from the top layer of the decorative laminate sheet assembly to reveal a decorative laminate exhibiting a desired holographic image.

5 Claims, 2 Drawing Sheets

U.S. PATENT DOCUMENTS

| | | | |
|---|---|---|---|
| 4,880,589 A | 11/1989 | Shigemoto et al. | |
| 4,911,477 A | 3/1990 | Shishido | 283/100 |
| 4,913,760 A | 4/1990 | Benson et al. | 156/244.11 |
| 4,925,728 A | 5/1990 | Crass et al. | 428/216 |
| 5,075,060 A | 12/1991 | Imataki | 264/167 |
| 5,082,706 A | 1/1992 | Tangney | 428/40 |
| 5,281,455 A | 1/1994 | Braun et al. | 428/40.7 |
| 5,336,463 A | 8/1994 | Hara et al. | 264/328.7 |
| 5,613,964 A | 3/1997 | Grenier | 604/385.1 |
| 5,908,591 A | 6/1999 | Lewit et al. | 264/46.4 |
| 5,958,595 A | 9/1999 | Toomey | 428/423.5 |
| 5,985,381 A * | 11/1999 | Conner | 428/15 |
| 6,093,256 A | 7/2000 | Dwiggins et al. | 134/36 |
| 6,423,167 B1 | 7/2002 | Palmer et al. | 156/209 |
| 6,444,072 B1 * | 9/2002 | Weder | 156/209 |

FOREIGN PATENT DOCUMENTS

| | | | | |
|---|---|---|---|---|
| EP | 0-370-331 A1 | 11/1989 | | |
| EP | 0-348-970 A2 | 1/1990 | | |
| EP | 348970 | 1/1990 | | |
| EP | 370689 | 5/1990 | | |
| EP | 0-370-689 A2 | 5/1990 | | |
| EP | 0-909-635 A2 | 4/1999 | | |
| EP | 909635 | 4/1999 | | B32B/27/30 |
| EP | 962315 | 12/1999 | | |
| EP | 0-962-315 A2 | 12/1999 | | |
| EP | 0-962-315 A3 | 1/2001 | | |
| JP | 58220735 | 12/1983 | | |
| JP | 58-220735 | 12/1983 | | |
| JP | 2-108599 | 4/1990 | | |
| JP | 63-263658 | 4/1990 | | |
| JP | 02-177313 | 3/1992 | | |
| JP | 4085347 B2 | 3/1992 | | |
| JP | 06-314223 | 6/1996 | | |
| JP | 8141499 | 6/1996 | | B05D/7/14 |
| JP | 08-208767 | 2/1998 | | |
| JP | 10035193 | 2/1998 | | B44C/1/165 |

* cited by examiner

HOLOGRAPHICALLY ENHANCED DECORATIVE LAMINATE

RELATED APPLICATION INFORMATION

This application is a continuation-in-part of U.S. patent application Ser. No. 09/092,480, filed Jun. 5, 1998, entitled "Textured Release Sheet, Method Of Making Textured Decorative Laminates Therewith, And Decorative Laminate Lay-Ups Including Such Sheet", which is currently pending.

BACKGROUND OF THE INVENTION

1. Field of the Invention

The invention relates to decorative laminates. More particularly, the invention relates to a method for producing decorative laminates incorporating a holographic image thereon.

2. Description of the Prior Art

High pressure decorative laminates are currently manufactured with smooth glossy surfaces, textured surfaces, or deeply sculpted and embossed surfaces. As general background, decorative laminates prepared by heat and pressure consolidation have been produced commercially for a number of years and have found widespread acceptance in the building and furniture industry as counter and tabletops, bathroom and kitchen work surfaces, wall paneling, flooring products, partitions and doors. These decorative laminates may be described as containing a number of laminae consolidated to form a unitary structure carrying a surface decoration. The surface decoration may range from something as simple as a solid color to something as complex as an embossed simulated wood grain finish.

Decorative laminates generally include plural layers of synthetic resin impregnated paper sheets bonded under heat and pressure to form a unitary structure. In normal practice, a decorative laminate sheet assembly, from the bottom up, includes a core of one or more phenolic resin impregnated sheets, above which lies a decorative resin-impregnated sheet. The decorative sheet may be further covered with a melamine-impregnated overlay.

The core, or base, functions to impart rigidity to the laminate. Prior to stacking, the sheets of the core member are impregnated with a water alcohol solution of phenol formaldehyde, dried and partially cured in a hot oven, and finally cut into shapes. The core may, for example, include a plurality of sheets of 41–68 kilogram phenolic resin impregnated kraft paper and a substrate. The kraft paper is impregnated throughout and bonded with a substantially completely cured phenolic resin which has been converted to a thermoset state during the initial laminating step.

The decorative sheet provides the laminate with an attractive appearance. The decorative sheet also dictates the surface characteristics of the decorative laminate. For example, the composition of the decorative sheet dictates the decorative laminate's resistance to chemical agents, heat, light, shock and abrasion. Decorative sheets are commonly manufactured from high quality 80 to 200 g/m² weight, pigment filled, alpha cellulose paper impregnated with a water alcohol solution of melamine-formaldehyde resin. The resin impregnated decorative sheets are subsequently dried, partially cured, and finally cut into sheets. The pigment filled, alpha cellulose paper of the decorative sheet, may include a solid color, a decorative design, or a photo-gravure reproduction of natural materials, such as, wood, marble, leather, etc. The aesthetic characteristics of the cellulose paper are revealed as the laminate's decorative design upon completion of the decorative laminate.

Additional rigidity may be added to the decorative laminate through the bonding of a substrate to the formed decorative laminate. In general, the substrate may be a pre-cured plastic laminate, such as glass fiber-reinforced thermoset polyester resin laminates and the like, a wood product, such as hardboard, wood waste or particle boards, plywood and the like, a mineral base board, such as, cement-asbestos board, sheet rock, plaster board, and the like, or a combination of substrates.

Decorative laminates are generally manufactured by placing the resin impregnated core and decorative sheet between steel plates and subjecting the laminate stack to temperatures in the range of approximately 110° C.–155° C. and pressures in the range of about 56.24 kg/cm²–112.48 kg/cm² for a time sufficient to consolidate the laminate and cure the resins (generally about 25 minutes to an hour). The pressure and heat force the resin in the paper sheets to flow, cure and consolidate the sheets into a unitary laminated mass referred to in the art as a decorative high pressure laminate. Finally, the formed decorative laminate is bonded to a reinforcing substrate, such as, plywood, hardboard, asbestos board, particle board or the like.

Generally, more than one laminate is formed at one time. Multiple laminates are formed by inserting a plurality of assembled sheets in a stack. Release sheets are positioned between the assembled sheets to separate the various laminates stacked together. After consolidation, the release sheets allow the individual laminates to be separated.

The above discussion generally relates to high pressure laminates. Where a less expensive, less durable laminate is required, low pressure laminates may be used by fabricators. Low pressure laminates are generally composed of only the decorative layer and the overlay. As with high pressure laminates, low pressure laminates may be secured to a substrate for added structural rigidity. The removal of the core results in a laminate which is cheaper to manufacture, but does not offer the strength and durability of high pressure laminates.

As mentioned above, the decorative sheet dictates the aesthetic appearance of the resulting decorative laminate. Prior decorative sheets range from vibrant colors to pure white, imitation wood to imitation granite, and many variations there between. The wide range of available designs provides consumers with a versatile, inexpensive product for fabricating countertops, flooring panels, wall panels, etc. The aesthetic appearance of the decorative laminate may be further enhanced by applying texture to the surface of the decorative laminate. The addition of such texture often provides the decorative laminate with a more natural appearance.

With this in mind, decorative laminate manufacturers and fabricators are continually attempting to develop laminates providing consumers with a new, aesthetically pleasing, visual experience. The present invention provides a decorative laminate offering consumers a novel visual experience by enhancing conventional decorative laminates with the addition of a holographic image.

SUMMARY OF THE INVENTION

It is, therefore, an object of the present invention to provide a decorative laminate lay-up including a decorative laminate sheet assembly having a top layer and a polypropylene release sheet applied to the top layer of the decorative laminate sheet assembly. The polypropylene release sheet is a cast polypropylene release sheet formed with a holographic transfer image.

It is a further object of the present invention to provide a decorative laminate manufactured by the process comprising the steps of stacking a decorative laminate sheet assembly having a top layer, casting a polypropylene release sheet wherein the polypropylene release sheet is formed with a holographic transfer image, positioning the polypropylene release sheet on the top layer of the decorative laminate sheet assembly, applying heat and pressure to the decorative laminate sheet assembly and the polypropylene release sheet sufficient to bond the decorative laminate and releasably bond the polypropylene release sheet to the top layer of the decorative laminate sheet assembly and removing the polypropylene release sheet from the top layer of the decorative laminate sheet assembly to reveal a decorative laminate exhibiting a desired holographic image.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
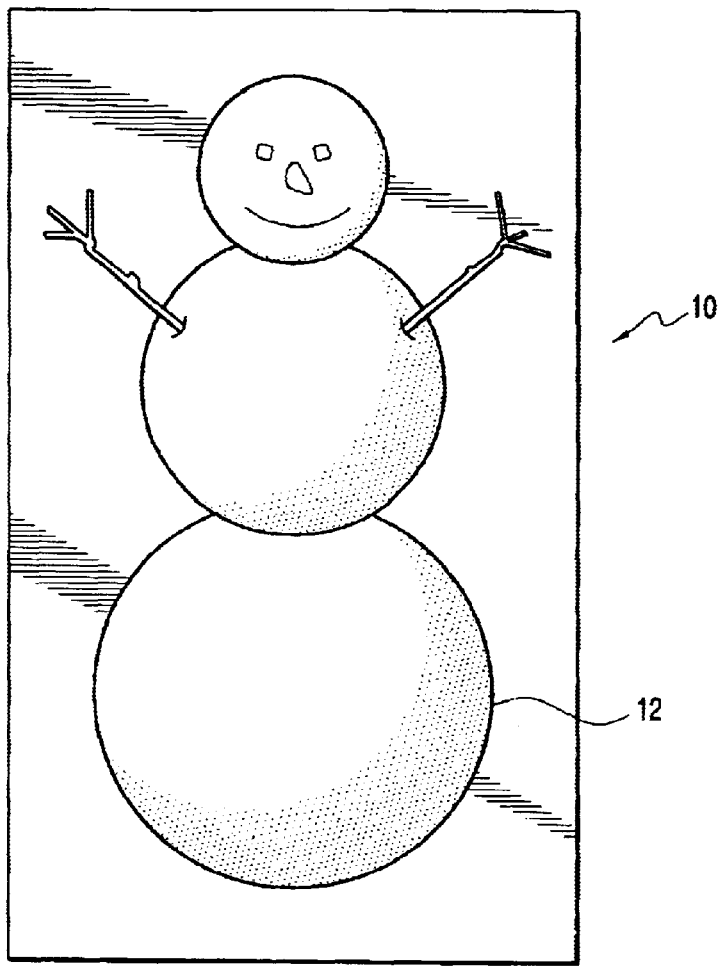
FIG. 1 is a top view of a decorative laminate manufacture in accordance with the present invention.

With reference to FIG. 1, a decorative laminate 10 in accordance with the present invention is disclosed. The decorative laminate 10 includes a holographic image 12 viewable by those in the vicinity of the decorative laminate 10. With the exception of the holographic image 12 incorporated thereon, the decorative laminate 10 is of a generally conventional construction and is formed from a laminate lay-up including an overlay layer 14, a pattern or decorative sheet 16, a core 18 and a propylene release sheet 20.

In accordance with a preferred embodiment of the present invention, the decorative laminate lay-up 22 is composed of a decorative laminate sheet assembly 24 with a polypropylene release sheet 20 positioned thereon. The laminate lay-up 22 is assembled by first stacking a decorative laminate sheet assembly 24 having a top layer. That is, the sheets used in the production of the decorative laminate 10 are stacked in preparation for the heating and pressure steps used to consolidate the laminate. The polypropylene sheet 20 is then placed upon the top layer of the decorative laminate sheet assembly 24 to complete the assembly of the laminate lay-up 22.

In accordance with a preferred embodiment of the present invention, the polypropylene release sheet 20 is formed by casting. As will be discussed below in substantial detail, the polypropylene release sheet 20 is imparted with a holographic transfer image. The holographic transfer image is imparted to the resulting decorative laminate 10 to introduce a holographic image 12 upon the upper surface of the decorative laminate 10.

Figure 2:
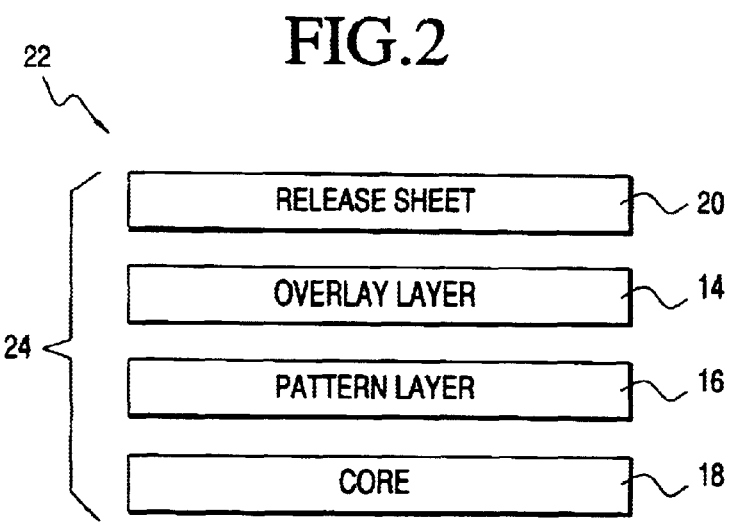
FIG. 2 is a schematic of the laminate lay-up including the polypropylene release sheet in accordance with the present invention.
Figure 3:
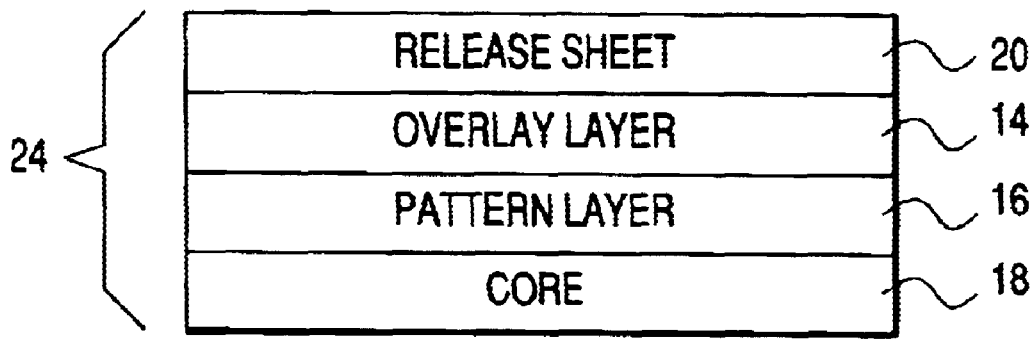
FIG. 3 is a schematic of the laminate lay-up after pressing and heating.
Figure 4:
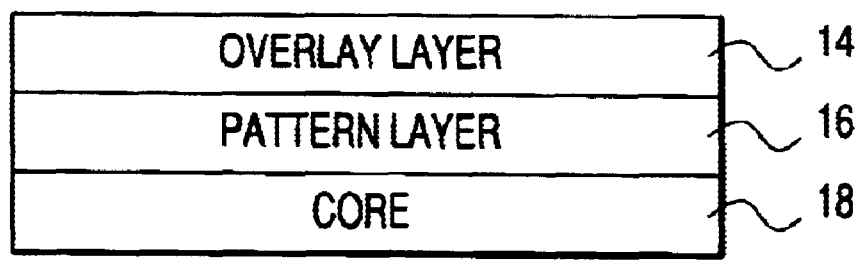
FIG. 4 is a schematic of the resulting decorative laminate.

With reference to FIG. 2, the polypropylene release sheet 20 is then positioned on the top layer of the laminate sheet assembly to form the laminate lay-up 22, and heat and pressure are applied to the laminate sheet assembly/polypropylene release sheet sufficient to bond the layers of the decorative laminate sheet assembly 24, and releasably bond the polypropylene release sheet 20 to the top layer of the decorative laminate sheet assembly 24 (see FIG. 3). Finally, the polypropylene release sheet 20 is removed from the top layer of the formed decorative laminate 10 to reveal a decorative laminate exhibiting a desired holographic image 12 (see FIGS. 1 and 4).

The decorative laminate 10 may be any of the many resin based decorative laminates known to those of ordinary skill in the art. In accordance with one embodiment of the present invention, and as discussed above, the decorative laminate 10 includes an overlay layer 14, a pattern layer 16 and a core layer 18 as shown in FIG. 3.

More specifically, the decorative laminate includes a core 18 composed of one or more layers of phenolic resin impregnated kraft paper and a decorative sheet composed of a pattern layer and a melamine overlay layer incorporating $Al_2O_3$ for wear resistance. As discussed above, a substrate may be subsequently bonded to the final decorative laminate 10 to add rigidity to the laminate; for example, the substrate may be chosen from a variety of materials, namely, plywood, particle board, chipboard, medium density fiberboard etc. Although a preferred decorative laminate is disclosed above, a wide variety of decorative laminates may be employed without departing from the spirit of the present invention.

As is well known to those of ordinary skill in the art, cast polypropylene release sheets are manufactured by extruding, rolling, cooling and cutting the polypropylene release sheets. In accordance with the present invention, the polypropylene release sheet may be generally described as either a propylene homopolymer or a copolymer of propylene and any other α-olefin.

The melt flow index of the polypropylene utilized in accordance with the present invention is selected to provide the desired physical properties necessary to produce textured decorative laminates exhibiting high gloss. Generally, the melt flow index will be in the range of approximately 1 to approximately 20 as measured utilizing ASTM D-1238. The melt flow index is preferably in the range of approximately 5 to approximately 15, and more preferably in the range of approximately 7 to approximately 12, as measured utilizing ASTM D-1238.

Non-limiting commercial examples of polypropylenes suitable for use in the present invention include EOD97-06 and EOD96-01, available from Fina (Dallas, Tex.) and ESCORENE polypropylene PD 4443, available from Exxon Chemical. EOD97-06 and EOD96-01 have a melt flow of 12 g/10 min. (ASTM D-1238 Condition "L"), density of 0.91 g/cc (ASTM D-1505), tensile strength of 407.7 kg/cm$^2$ (ASTM D-638), elongation of 10 percent at yield, tensile modulus of 19,684 kg/cm$^2$ (ASTM D-638), flexural modulus of 18,981 kg/cm$^2$ (ASTM D-790), melting point of 167° C. (DSC), and a recrystallization point of 127° C. ESCORENE polypropylene PD 4443 has a melt flow of 7.25 g/10 min. (ASTM 1238), density of 0.90 g/cm$^3$ (ASTM D792), tensile strength of 232 kg/cm$^2$ in the machine direction, elongation at yield of 5% in both the machine and transverse directions, tensile strength at break of 562.4 kg/cm$^2$ in the machine direction and 492.1 kg/cm$^2$ in the transverse direction, elongation at break of 660 percent in both the machine and transverse directions, haze of 2.5%, gloss of 85% and a coefficient friction of 0.3.

As is well known to those of ordinary skill in the art, various processes and catalysts exist for the production of polypropylene. It is, therefore, contemplated that various processes and catalysts may be utilized without departing from the spirit of the present invention.

For example, traditional Ziegler-Natta catalyst systems may be employed in accordance with the present invention. Ziegler-Natta catalyst systems utilize a transition metal compound cocatalyzed by an aluminum alkyl. Having been around since the early 1950's, the general manufacture methods for Ziegler-Natta type polyolefin catalysts, as well as general methods of making and subsequent use, are well known in the polymerization art.

More specifically, a Ziegler-Natta type polymerization catalyst is basically a complex derived from a halide of a transition metal, for example, titanium, chromium or vanadium, with a metal hydride and/or a metal alkyl that is typically an organoaluminum compound. The catalyst component is usually comprised of a titanium halide supported on a magnesium compound complexed with an alkylaluminum, and may even include an electron donor. Examples of such catalyst systems are shown in the following U.S. Pat. Nos.: 4,107,413; 4,294,721; 4,439,540; 4,115,319; 4,220,554; 4,460,701; and 4,562,173; the disclosures of these patents are hereby incorporated by reference. These are just a few of the hundreds of issued patents relating to catalysts and catalyst systems designed primarily for the polymerization of propylene and ethylene.

"Metallocene" catalysts may also be used in accordance with the present invention. "Metallocene" catalysts include a metallocene and an aluminum alkyl component. The transition metal compound of a metallocene catalyst system has two or more cyclopentadienyl ring ligands. Accordingly, titanocenes, zirconocene and hafnocenes have all been utilized as the transition metal component in such "metallocene" containing catalyst systems for the production of polyolefins.

In accordance with a preferred embodiment of the present invention, extrusion and cast embossing are preferably employed to produce the polypropylene release sheets imparting the desired holographic image to the decorative laminate. However, it is contemplated that other techniques may be used without departing from the spirit of the present invention.

Briefly, and with regard to the extrusion of a polypropylene release sheet, the polypropylene is forced through an extrusion die in a melted state and subsequently cooled into a sheet as the melted extrudate passes between chill rollers. The chill rollers apply the desired holographic transfer image to the front surface of the sheet. The holographic transfer image applied to the polypropylene release sheet is designed to impart a holographic image upon the decorative laminate. The textured sheet is manufactured with a smooth back surface.

It is contemplated that the polypropylene release sheet is impart with a lenticular pattern through the use of a lenticular sheet, for example, Eastar Copolyester by Barlo Plastics, although other techniques for imparting the holographic image to the polypropylene sheet may be applied without departing from the spirit of the present invention. In addition, it is further contemplated that improved holographic imaging may be achieved by utilizing digital imaging and 2-dimensional to 3-dimensional conversions.

In cast embossing, flowable polypropylene is deposited or "cast" onto an embossing surface and subsequently cooled to form a polypropylene sheet. The embossing surface onto which the polypropylene is cast is suitable to provide the desired holographic transfer image to the thus formed sheet.

Regardless of the method for forming the polypropylene release sheet formed with a holographic transfer image in accordance with the present invention, it is critical that the holographic transfer image is imparted to the polypropylene release sheet generally while the polypropylene is still above the softening temperature, preferably while still above the melting temperature. The resulting textured release sheet will have a textured front surface and a smooth back surface.

The holographic transfer image applied to the polypropylene release sheet may take any form, dimension or pattern imaginable. In general, the peak-to-valley height R$_z$ of the texturing surface may be any desirable, but is preferably greater than 2.54 microns, more preferably greater than about 5.08 microns, and even more preferably greater than about 7.62 microns. However, those skilled in the art will readily appreciate that the polypropylene release sheet should be formed with an optical profile providing the overlay with desired optical characteristics, and such consideration will certainly vary depending on the material and mechanical construction of the laminate, as well as the image being applied. As such, the polypropylene release sheet may be manufactured with various optical profiles without departing from the spirit of the present invention.

The thickness of the textured release sheet of the present invention may be varied within a wide range of limits. If the sheet is too thin, the texture will tend not to transfer. Economic factors tend to set the upper limit for the thickness of the sheet. In general, the thickness of the textured release sheet will be at least 25 microns, and preferably at least 38 microns, and more preferably at least 51 microns.

The polypropylene release sheet formed with a holographic transfer image provides a holographic image to decorative laminates formed in accordance with the present invention and also functions as a release sheet between conventional decorative laminate lay-ups. With this in mind, the present polypropylene sheets may be used in the gang processing of laminates or the present polypropylene sheets may be used in the manufacture of single laminate sheets to simply impart a desired holographic image to the decorative laminate.

The present polypropylene release sheet is employed to add the holographic image to the decorative laminate in the following manner. A typical decorative laminate sheet assembly includes several layers of a thermosetting resin impregnated core stock (preferably kraft paper) supporting a thermosetting resin impregnated decorative layer, which may be further overlaid with a thermosetting resin impregnated overlay sheet. The thermosetting resin employed is preferably a phenolic resin for the core stock, and preferably a clear melamine formaldehyde resin for the decorative and overlay sheets. The surface of the release sheet formed with the holographic transfer image is oriented against the top most layer of the decorative laminate sheet assembly, be it the decorative sheet or overlay sheet, with the smooth back surface of the polypropylene release sheet positioned against the core stock of an adjacent lay-up or steel plate.

Upon pressing between suitable laminate press plates, the polypropylene release sheet imparts a holographic image to the top most layer of the first lay-up, and serves to allow release between the first lay-up and the adjacent lay-up. A platen press assembly, as is well known in the lamination art, provides the necessary heat and/or pressure during lamination.

In practice, there may be utilized, as desired and/or necessary, antioxidants, antiblock agents, slip agents, cross linking agents, stabilizers, ultraviolet ray absorbers, lubricants, foaming agents, antistatic agents, organic and inorganic flame retardants, plasticizers, dyes, pigments, talc, calcium carbonate, carbon black, mica, glass fibers, carbon fibers, aramid resin, asbestos, as well as other fillers as are known in the art.

The polypropylene utilized in the present invention may be further blended with, or incorporated into, one or more other thermoplastics. Suitable other thermoplastics include polyolefins, especially polyethylenes, other polypropylenes, polyesters, polyacrylamindes, polyamides, polycarbonates, polyurethanes, polyacrylonitriles, and butadiene styrenes. Preferred polyethylenes include linear low density polyethylenes.

In addition to the application of a holographic image to a decorative laminate, the polypropylene release sheets discussed above may simultaneously be used to impart texture to the decorative laminate in accordance with commonly owned U.S. patent application Ser. No. 09/092,480, entitled "Textured Release Sheet, Method Of Making Textured Decorative Laminates Therewith, And Decorative Laminate Lay-Ups Including Such Sheet", filed Jun. 5, 1998, which is incorporated herein by reference. Similarly, gloss imparting techniques as disclosed in commonly owned U.S. patent application Ser. No. 09/441,075, entitled "Method For Controlling Laminate Gloss", which is incorporated herein by reference.

It is contemplated that the holographic image applied to the top layer of the decorative laminate in the manner discussed above may be susceptible to wear and, ultimately, degradation of the applied holographic image. It is, therefore, contemplated that a wear coating may be applied to the decorative laminate after the holographic image is formed thereon.

While the preferred embodiments have been shown and described, it will be understood that there is no intent to limit the invention by such disclosure, but rather, is intended to cover all modifications and alternate constructions falling within the spirit and scope of the invention as defined in the appended claims.

EXAMPLES

The following non-limiting examples are provided merely to illustrate the present invention and are not meant to limit the scope of the claims of the present invention.

Example 1

Thirty-nine films of various morphologies were post-embossed cold using a 6"×6" lab press. For texturing, 120 grit sandpaper and 80 grit sandpaper were used. Film samples listed in Table 1 were cut into 6" squares, paired with the sandpaper and pressed for one minute at 1000 psi. The cold embossed films were then pressed, textured side to face, with resin impregnated decorative and kraft papers to make a high pressure laminate under high pressure decorative laminate (HPDL) conditions well known to those in the art. All films flattened under HPDL conditions and transferred no pattern.

TABLE 1

| NAME | DESCRIPTION | THICKNESS | SUPPLIER | TYPE |
| --- | --- | --- | --- | --- |
| Toray | clear | 2 mil | Toray No Kingstown, | OPP |
| Toray | matte | 1 mil | | |
| Melinex 378 | matte | 92 ga | ICI Hopewell, VA | PET |
| Melinex HS2 | hazy | 92 ga | ICI | PET |
| Mylar ED11 | matte | 5 mil | Dupont | PET |
| Mylar XM020 | clear | 2 mil | Dupont | PET |
| Dartek C-917PA | clear | 2 mil | Dupont Canada | Nylon |
| Phanex YMC | matte | 2 mil | Hoechst Celenese | PET |
| Phanex IHC | clear | 2 mil | Hoechst Celenese | PET |
| Tedlar TMR10SM3 | matte | 1 mil | Dupont | PVF |
| Tedlar TMR10SM3 | matte | 2 mil | Dupont | PVF |
| XM020 | clear | 1 mil | Dupont | PEN |
| Embossed Laminated | clear | 2 mil | Cypress Pkg | PET/OPP |
| Dartek T420NA | clear | 1 mil | Dupont Canada | Oriented Nylon |
| Dartek TC101NA | clear | 1 mil | Dupont Canada | Cast Nylon |
| Dartek C101NA | clear | 1 mil | Dupont Canada | Cast Nylon |
| Mylar 100XM020LS | hazy | 1 mil | Dupont | PET |
| Mylar 100XM020 | hazy | 1 mil | Dupont | PET |
| Kapton 100HN | gold/clear | 1 mil | Dupont | PI |
| Kapton 200HN | gold/clear | 2 mil | Dupont | PI |
| Kapton 100HA | gold/clear | 1 mil | Dupont | PI |
| Kapton 200HA | gold/clear | 2 mil | Dupont | PI |
| Kapton 200JP | gold/clear | 2 mil | Dupont | PI |
| Kapton 100JP | gold/clear | 1 mil | Dupont | PI |
| Tedlar TTR20SG4 | clear | 2 mil | Dupont | PVF |
| EX399 | white | 2 mil | Exxon | CPP |
| EX393 | white | 3 mil | Exxon | CPP |
| EX355 | matte | 3 mil | Phillips Joanna | PP |
| 3700 TIS | | 3 mil | Moire of NC | UNK |
| Moire 763 | clear | 2 mil | Dupont | PET |
| Mylar 200J101 | clear | 2 mil | Dupont | PET |
| Mylar 200A | clear | 2 mil | Dupont | PET |

TABLE 1-continued

| NAME | DESCRIPTION | THICKNESS | SUPPLIER | TYPE |
|---|---|---|---|---|
| Mylar 200D | clear | 2 mil | Dupont | PET |
| Mylar 640 GA 848 | clear | 6 mil | Dupont | PET |
| Mylar 200 J102 | clear | 2 mil | Dupont | PET |
| Mylar 200EL | clear | 2 mil | Dupont | PET |
| Mylar 200EB | clear | 2 mil | Dupont | PET |
| Melinex 378 | matte | 2 mil | ICI | PET |
| Melinex 378 | matte | 92 ga | ICI | PET |
| Melinex HS2 | clear | 92 ga | ICI | PET |

Example 2

A cycle was established for hot embossing PET and polypropylene (PP) against an aluminum wire mesh. The cycle for PET was 350° F. for 3.5 minutes. Polypropylene films were embossed at 290° F. for 3.5 minutes. Films listed in Table 2 embossed in this manner resulted in a film sample with a uniform texture on one side and a smooth surface on the other. All film samples transferred a uniform texture onto a laminate when pressed under HPDL conditions. Two film samples received in house already possessed a uniform texture on one side and a smooth surface on the other. These two were Moire Fingerprint film and Mylar 200WC from Dupont. Both samples transferred a uniform texture onto a laminate when pressed under HPDL conditions.

TABLE 2

| Melinex 377,92 ga | ICI | PET |
| Mylar ED31, 1 mil | Dupont | PET |
| Tedlar TMR102M3 | Dupont | PVF |
| 100 XM020LS, 1 mil | Dupont | PEN |
| Kapton 100HN, 1 mil | Dupont | PI |
| Cast PP, 4 mil | PhilJo | PP |
| Cast PVC, 7 mil | Texas T&R | PVC |

Example 3

Polymer resins were obtained from outside sources and cast extruded using a 25 mm co-rotating twin screw extruder under the following extrusion conditions:

| Barrel Temp. | 170° C. |
| Die Zone Temp. | 170° C. |
| Melt Temp. | 175° C. |
| Feeder Rate | 20 lbf/hr |
| Sheet Caliper | 10 mils |
| Extruder Speed | 100 rpm |

The extruded film was cast embossed using a textured chill roll in the center of a 3-stack roll assembly. The embossed chill roll was engraved with a sand texture of 350 Ra. Polymers listed in Table 3 were extruded in this manner.

TABLE 3

| SOURCE | NAME | RESIN | % TRANSFER | LAMINATE GLOSS |
|---|---|---|---|---|
| Chemiplas | N/A | PET | 82 | 3.0 |
| Exxon | Escorene PD 4443 | PP | 75 | 7.0 |
| Eastman Chemical Co. | PET 10388 | PET | 85 | 3.0 |

TABLE 3-continued

| SOURCE | NAME | RESIN | % TRANSFER | LAMINATE GLOSS |
|---|---|---|---|---|
| ICI Americas | Melinar PET | PET | 85 | 2.8 |
| Rexene Products | PP13T10A | PP | 75 | 3.2 |
| Rexene Products | PP 13S10A | PP | 70 | 3.0 |
| Fina | EOD 97-06 | PP | 75 | 10.0 |

In all cases, film was made that resulted in a uniform texture on one side and a smooth surface on the other. All samples transferred uniform texture onto a laminate under HPDL conditions.

Profilometer readings of the film and laminate were measured to evaluate the amount of texture transfer. The results are listed in Table 3.

Example 4

Fina EOD 97-06 and Exxon Escorine PD4443 were extruded under the same conditions as Example 3. The chili roll temperature was vaned in order to determine if chill roll temperature effects gloss. The film was used to prepare high pressure laminates by standard means. The results are listed in Table 4.

TABLE 4

| | Chill roll temp | Laminate gloss |
|---|---|---|
| Fina EOD 9706 | 75° C. | 12.6 |
| | 95° C. | 23.2 |
| | 115° C. | 28.9 |
| Exxon PD 4443 | 75° C. | 9.8 |
| | 95° C. | 13.6 |
| | 115° C. | 20.0 |

Example 5

Fina EOD 97-06 was extruded in a 30 to 1 length to diameter ratio single screw, 4.5' wide into a flat die with a chill roll casting section, at varying conditions in order to determine conditions that effect texture transfer. The first chill roll was textured with sand texture of 450 Ra paired with a rubber roll. After extrusion, the films were aged for 48 hours at ambient temperature then used to make high pressure laminates under standard HPDL conditions. The surface textures of the films and laminates were measured with a Federal Surfanalyzer 5000 in order to determine percent texture transfer. The conditions and results are listed in Table 5.

TABLE 5

| Sample # | Chill Roll (F) | Line Speed (FPM) | Extuder Speed | Film Gauge | Nip Pressure | % Texture Transfer | Laminate Gloss |
|---|---|---|---|---|---|---|---|
| 1 | 150 | 48 | 76 | 3.8 | 18 | 50 | 6.6 |
| 2 | 150 | 48 | 76 | 3.5 | 55 | 46 | 5.9 |
| 3 | 150 | 48 | 76 | 3.8 | 35 | 70 | 6.4 |
| 4 | 150 | 84 | 135 | 3.5 | 38 | 65 | 7.3 |
| 5 | 150 | 74 | 135 | 3.5 | 38 | 85 | 7.5 |
| 6 | 150 | 50 | 65 | 3.5 | 35 | 61 | 5.7 |
| 7 | 150 | 56 | 56 | 2.5 | 35 | 59 | 4.8 |
| 8 | 150 | 50 | 67 | 3.0 | 35 | 80 | 5.6 |
| 9 | 90 | 50 | 78 | 3.8 | 35 | 70 | 3.1 |
| 10 | 90 | 50 | 78 | 3.8 | 18 | 74 | 3.9 |
| 11 | 90 | 50 | 78 | 3.5 | 55 | 61 | 3.3 |
| 12 | 230 | 50 | 78 | 3.5 | 55 | 82 | 9.4 |
| 13 | 230 | 50 | 78 | 3.8 | 18 | 83 | 9.4 |
| 14 | 230 | 50 | 78 | 3.5 | 35 | 81 | 11.6 |
| 15 | 230 | 60 | 78 | 3.0 | 35 | 80 | 11.2 |
| 16 | 230 | 71 | 78 | 2.5 | 35 | 74 | 10.9 |
| 17 | 230 | 71 | 78 | 2.5 | 55 | 77 | 8.3 |
| 18 | 230 | 89 | 77 | 2.0 | 55 | 43 | 9.5 |

| Barrel Temperatures: | |
|---|---|
| 1 | 400° F. |
| 2 | 400 |
| 3 | 400 |
| 4 | 415 |
| 5 | 450 |
| 6 | 480 |
| Head Zone | 430 |
| Adapters | 410 |
| Melt Temp | 451 |
| Head Pressure | 1200 |
| Die Pressure | 1050 |
| Extruder Speed | 76 RPM |

What is claimed is:

1. A decorative laminate lay-up, comprising:
a decorative laminate sheet assembly having a top layer,
a polypropylene release sheet including a textured first surface and a smooth second surface opposite the first surface, wherein the textured first surface of the polypropylene release sheet includes a holographic transfer image and the first surface faces the top layer of the decorative laminate sheet assembly such that the polypropylene release sheet imparts desired texture to the decorative laminate sheet assembly when placed against the decorative laminate sheet assembly and subjected to heat and pressure.

2. The decorative laminate lay-up according to claim 1, wherein the decorative laminate sheet assembly includes an overlay layer, a decorative sheet and a core.

3. The decorative laminate lay-up according to claim 1, wherein the polypropylene release sheet has a melt flow index of 1 to 20 measured using ASTM D-1238.

4. The decorative laminate lay-up according to claim 3, wherein the polypropylene release sheet has a melt flow index of 7 to 12 measured using ASTM D-1238.

5. The decorative laminate lay-up according to claim 1, wherein the holographic image is formed with a lenticular pattern.

* * * * *